United States Patent [19]
Hagin

[11] 4,421,339
[45] Dec. 20, 1983

[54] ARTICULATED VEHICLE, PARTICULARLY A BUS

[75] Inventor: Faust Hagin, München, Fed. Rep. of Germany

[73] Assignee: M.A.N. Maschinenfabrik Augsburg Nurnberg Aktiengesellschaft, Munich, Fed. Rep. of Germany

[21] Appl. No.: 287,294

[22] Filed: Jul. 27, 1981

[30] Foreign Application Priority Data

Aug. 8, 1980 [DE] Fed. Rep. of Germany ....... 3030015

[51] Int. Cl.³ .............................................. B60D 5/00
[52] U.S. Cl. ................................... 280/460 R; 105/3; 280/403; 280/424; 280/432
[58] Field of Search ........... 280/403, 424, 432, 446 B, 280/460 R; 105/3, 4, 8, 15, 18

[56] References Cited

U.S. PATENT DOCUMENTS

| | | | |
|---|---|---|---|
| 2,843,417 | 7/1958 | Wahl et al. .......................... | 280/403 |
| 4,106,792 | 8/1978 | Schultz et al. ...................... | 280/432 |
| 4,168,848 | 9/1979 | Buschenhenke .................... | 280/432 |
| 4,269,425 | 5/1981 | König et al. ........................ | 280/403 |

Primary Examiner—Joseph F. Peters, Jr.
Assistant Examiner—Donn McGiehan
Attorney, Agent, or Firm—Scully, Scott, Murphy & Presser

[57] ABSTRACT

An articulated vehicle such as, a bus having a lead car and a trailer coupled to each other through the intermediary of a central ball joint in the central longitudinal plane of the vehicle. The central ball joint transmits only horizontal forces between the lead car and the trailer and can therefore be supported through comparatively lightweight elements which require little space. The transmission of vertical forces between the lead car and trailer is effected through arms located on both sides of the joint. A cardan shaft is extended along the longitudinal center plane of the articulated vehicle from the lead car to the trailer.

6 Claims, 5 Drawing Figures

ARTICULATED VEHICLE, PARTICULARLY A BUS

BACKGROUND OF THE INVENTION

1. Field of the Invention

The present invention relates to an articulated vehicle and, more particularly, to a bus having a lead car and a trailer coupled to each other through the intermediary of a central ball joint extending along the central longitudinal plane of the vehicle.

2. Discussion of the Prior Art

Presently known articulated vehicles having a construction of this type are subject to the disadvantage that a considerable amount of constructional space is required in the region of the joint, thereby rendering it practically impossible to extent a drive shaft from one vehicle section to the other while still maintaining the height of the vehicle floor above the road at a reasonable level. A further disadvantage encountered in known articulated vehicles lies in the fact that provisions which are made to dampen bouncing movements of the trailer require a considerable complexity in the constructive elements. Finally, another disadvantage in the prior art is that the rotatable or pivoted platform which is normally provided above the pivot joint region in known articulated buses will not be flush with the remaining floor under all conditions of travel, but during some conditions of travel extensive gaps will be encountered between the pivotable platform and the remaining floor of the vehicle as to form an accident hazard for passengers.

SUMMARY OF THE INVENTION

In one basic aspect of the present invention there is provided a vehicle of the above-described generic category in which sufficient constructional space is permitted to remain in the region of the joint for extending the drive shaft therethrough so that, with only minor additional constructional complexity, a damping arrangement can be incorporated to counteract bucking movements of the trailer, and wherein, in the case of buses, a flush transition is ensured under all conditions of travel between the floors of the two portions of the vehicle and the interconnecting pivotal platform.

Accordingly, it is a specific object of the present invention to provide an articulated vehicle of the above-described general type and construction which ameliorates or eliminates the disadvantages encountered in the prior art.

A principal advantage afforded by the vehicle construction of the present invention lies in that the central ball joint will now transmit only horizontal forces between the lead car and the trailer of the vehicle and can therefore be supported through comparatively lightweight elements which require little space. The transmission of vertical forces between the lead car and the trailer is effected through arms located on both sides of the joint, which is within a region affording sufficient constructional height. In this manner a cardan shaft can be readily extended along the longitudinal center plane of the articulated vehicle from the lead car to to the trailer without necessarily increasing the required distance between the vehicle floor and the road level.

The provisions for support of the rotary platform of an articulated bus according to the present invention renders possible the formation of gaps between the pivotal platform and the vehicle floors of, respectively, the lead car and the trailer which remain constant in size during all traveling conditions, considering that in actuality the momentary buckling axis of the two cars relative to each other coincides with the pivot axes of the semicircularly-shaped plates of the pivot platform.

BRIEF DESCRIPTION OF THE DRAWINGS

Reference may now be had to a preferred embodiment of the present invention as detailed hereinbelow in conjunction with the accompanying drawings; in which.

DETAILED DESCRIPTION

Figure 1:
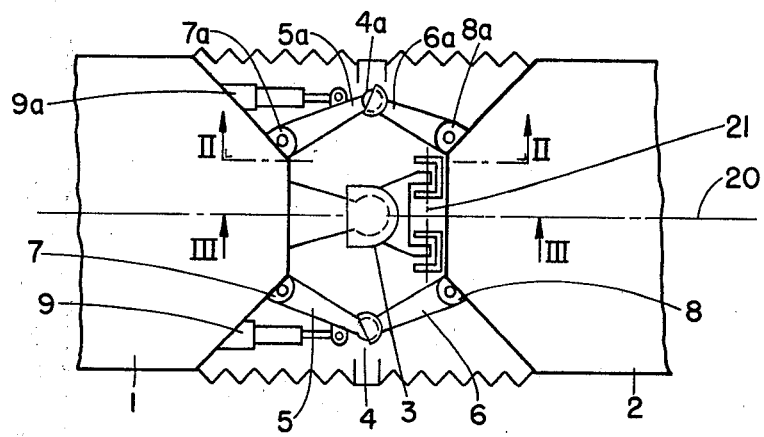
FIG. 1 is a generally diagrammatic plan view illustrating the pivot joint region of an articulated vehicle in its extended straight traveling position, with the pivotal platform shown removed.

Having reference to the generally diagrammatic arrangement in FIG. 1 of the drawings, a lead car of an articulated vehicle is identified by the reference numeral 1 and a trailer by the reference numeral 2. The longitudinal centerline of the vehicle is indicated by the reference numeral 20. The lead car 1 and the trailer 2 are coupled to each other by a central ball joint 3 which is arranged in the longitudinal center plane of the vehicle, wherein one member of the central ball pivot is attached to an arm 31 which is flexurally rigidly connected to the lead car, whereas the other member of the central ball joint 3 is attached to a shackle 22 which is pivotally connected to the trailer 2 so as to be adapted for rotation about a horizontal transverse axis 21 of the vehicle. The pivotal connection of the shackle 22 to the trailer 2 prevents vertical forces from being transmitted between the vehicle portions 1 and 2 through the central ball joint 3.

Figure 4:
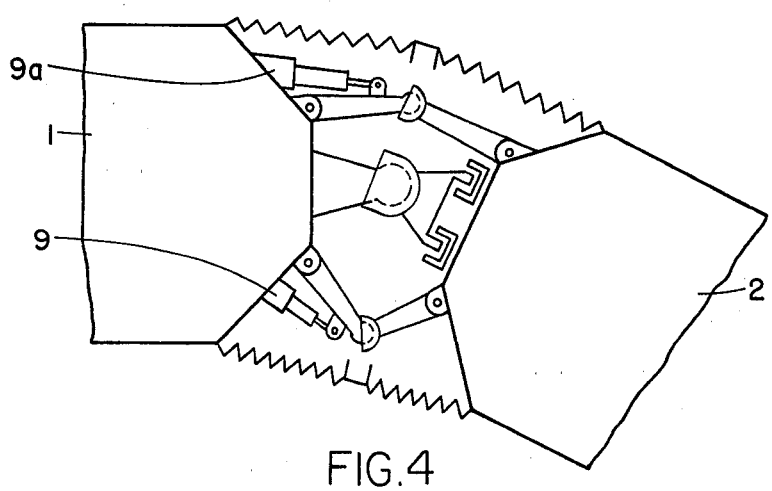
FIG. 4 is plan view illustrating the articulated vehicle of FIG. 1, but shown in an angled mode of travel.

In order to provide for an additional coupling effect between the lead car 1 and the trailer 2, arms 5 and 5a are connected on either side of the central ball joint to the lead car 1, and arms 6 and 6a are connected to the trailer 2. The arms 5, 5a are pivotally connected to the lead car through hinges 7, 7a so as to facilitate rotation about vertical axes, whereas the arms 6, 6a are pivotally connected to the trailer through hinges 8, 8a allowing for rotation about vertical axes. The respective pairs of arms on either side of the vehicle, in essence 5a, 6a and 5, 6, are connected to each other through ball joints 4, 4a, wherein the ball joints 4, 4a are arranged at the same level above the road. In this arrangement, vertical forces and horizontal forces are transmitted separately between the two vehicle portions 1 and 2, all vertical forces being transmitted through the arms 5, 5a, 6, 6a, and the horizontal forces being transmitted through the shackle 22 and the central ball joint 3. Separate transmission of vertical and horizontal forces through different components of the pivot arrangement is restrained only to the extent in that additional damping elements are provided to prevent buckling movements of the trailer. These damping elements are incorporated in the form of hydraulic or pneumatic piston-and-cylinder elements which are arranged horizontally and which extend in the longitudinal direction of the vehicle, and in the embodiment disclosed herein, between the frame of the lead car and the respective arm 5, 5a. In the illustrated embodiment, these hydraulic or pneumatic cylinders are identified by the reference numerals 9, 9a. Instead of being arranged between the vehicle frame of the lead car and the arms 5, 5a these damping elements can alternatively be pivotally connected, to provide the same operative effect, between the vehicle frame of the trailer 2 and the arms 6, 6a, or, similarly each between two arms, which would be between arms 5 and 6, and 5a and 6a. The hydraulic or pneumatic cylinders can also be optionally used as cushioning damper stops which would limit the buckling angle between the two cars of the vehicle, and which can be achieved by employing suitable engaging or control provisions. By way of example, FIG. 4 illustrates a buckling or angled position of the articulated vehicle in a plan view, in which the maximum buckling angle between the lead car 1 and the trailer 2 has been reached and in which, accordingly, the hydraulic or pneumatic cylinder 9a has attained its maximum extended length.

Figure 2:
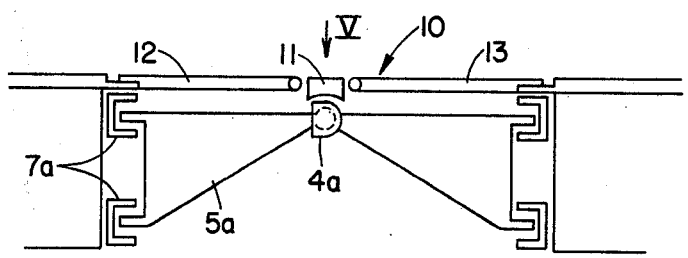
FIG. 2 is a longitudinal sectional view taken along line II—II in the arrangement of FIG. 1.
Figure 3:
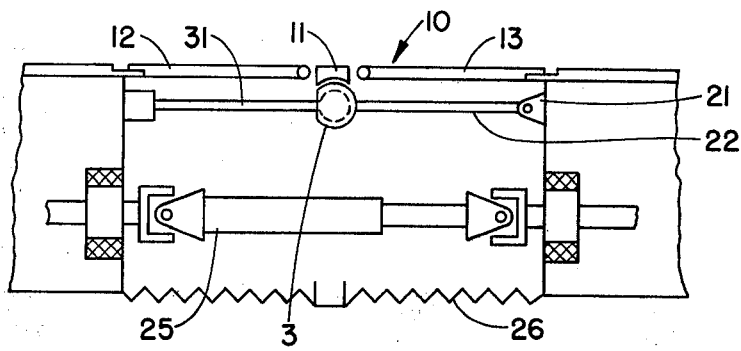
FIG. 3 is a longitudinal sectional view taken along line III—III in the arrangement of FIG. 1.
Figure 5:
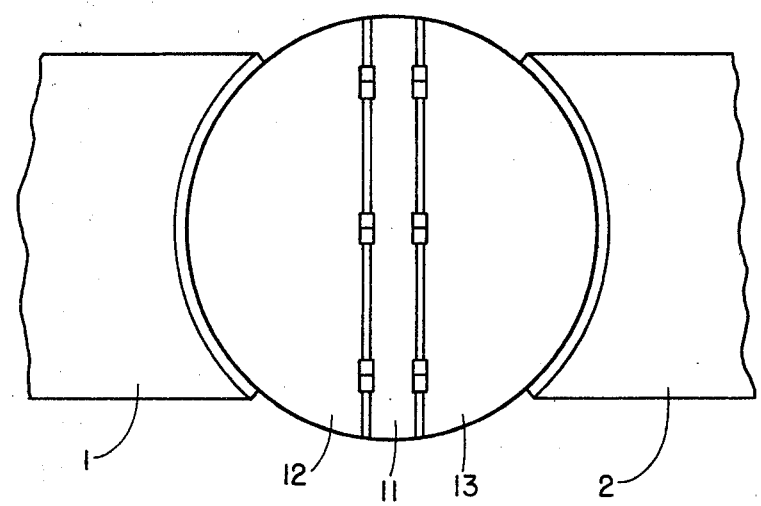
FIG. 5 is a view, on an enlarged scale, of the semicircular plates which are hinged to the central strut of the pivotal platform, taken in the direction of arrow V in FIG. 2.

As shown in FIGS. 2, 3 and 5 of the drawings, covering provisions for the pivot region is achieved through a rotary or pivotable platform which is generally identified by the reference numeral 10, and which extends flush or coplanar with the vehicle floors of the lead car and trailer. The pivotable platform 10 includes a central strut 11 which extends at a right angle to the longitudinal centerline of the vehicle and hinged at either side thereof to semicircular plates 12, 13. At their outer rims the semicircular plates 12, 13 fit loosely into corresponding recesses formed in the lead car 1 and in the trailer 2 so as to produce a flush transition between the floors of the lead car and the trailer and the rotary platform. The central strut 11 is supported by the central and the lateral ball joints 3, 4, 4a in a manner whereby, for instance, ball sockets are provided on the central strut 11 adapted to rest on the respective cup bearing of the ball joints. Supporting the central strut 11 in the immediate area of the ball joints 3, 4, 4a renders certain that when the articulated vehicle is in a buckling position and when, simultaneously, the buckling angle differs from zero, the semicircular plates 12, 13 will not project above the floor level of the lead car 1, and trailer 2 to form possible stumbling edges for passengers.

As becomes readily apparent from FIG. 3 sufficient constructional space is available in the central region of the vehicle joint to allow for extension of a cardan shaft from the lead car into the trailer or in the reverse direction without appreciably increasing the overall height of the vehicle floor assembly in this region. The cardan shaft is identified by reference numeral 25. The joint area is closed off from the exterior by using a bellows construction 26, which is generally well-known in connection with articulated vehicles.

What is claimed is:

1. In an articulated vehicle, such as a bus, including a lead car and a trailer; a central ball joint arranged in the central plane of the vehicle coupling said lead car to said trailer; the improvement comprising: a shackle pivotally mounted about a horizontal transverse axis at the trailer and connecting said trailer to the ball joint; a pair of arms being arranged respectively, on either side of the central ball joint on the lead car and on the trailer for rotation about a vertical axis and further ball joints on each side of the vehicle for interconnecting the arms of the lead car and of the trailer, said further ball joints being arranged at the same level.

2. Articulated vehicle as claimed in claim 1, wherein each pair of arms on one side of the vehicle forms an angle open towards the center of the vehicle when the vehicle is in its straight position.

3. Articulated vehicle as claimed in claim 1 or 2, comprising a damper element mounted on each side of the vehicle, said damper element being mounted between the vehicle frame and one said arm.

4. Articulated vehicle as claimed in claim 3, said damping element being formed by a hydraulic cylinder arrangement.

5. Articulated vehicle is claimed in claim 3, said damping element being formed by a pneumatic cylinder arrangement.

6. Articulated vehicle as claimed in claim 1, comprising a rotary platform having a central strut extending at right angles to the longitudinal centerline of the vehicle, said platform including semicircular plates hinged to either side of said strut and arranged above the joint area, said said central strut being supported on the central ball joint and said further ball joints.

* * * * *